United States Patent
Wu et al.

(10) Patent No.: US 10,737,342 B2
(45) Date of Patent: Aug. 11, 2020

(54) CABLE CONNECTOR ASSEMBLY AND IMPROVED CABLE

(71) Applicant: FOXCONN INTERCONNECT TECHNOLOGY LIMITED, Grand Cayman (KY)

(72) Inventors: Jerry Wu, Irvine, CA (US); Jun Chen, Kunshan (CN); Fan-Bo Meng, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 124 days.

(21) Appl. No.: 15/638,401

(22) Filed: Jun. 30, 2017

(65) Prior Publication Data

US 2018/0001407 A1    Jan. 4, 2018

(30) Foreign Application Priority Data

Jun. 30, 2016    (CN) .......................... 2016 1 0498681

(51) Int. Cl.
*H01B 11/04* (2006.01)
*H01R 9/03* (2006.01)
(Continued)

(52) U.S. Cl.
CPC ............. *B23K 1/0016* (2013.01); *B23K 26/22* (2013.01); *B23K 26/24* (2013.01); *B23K 26/32* (2013.01);
(Continued)

(58) Field of Classification Search
CPC .. H01R 13/665; H01R 13/6658; H01R 24/60; H01R 13/6467; H01R 13/6592;
(Continued)

(56) References Cited

U.S. PATENT DOCUMENTS

| 5,956,445 A | * | 9/1999 | Deitz, Sr. | G02B 6/441 |
| | | | | 174/24 |
| 7,923,638 B2 | * | 4/2011 | Kaczmarski | H01B 7/187 |
| | | | | 174/110 R |

(Continued)

FOREIGN PATENT DOCUMENTS

| CN | 204884664 U | 12/2015 |
| CN | 205069171 U | 3/2016 |

(Continued)

*Primary Examiner* — Amy Cohen Johnson
*Assistant Examiner* — Paul D Baillargeon
(74) *Attorney, Agent, or Firm* — Wei Te Chung; Ming Chieh Chang

(57) ABSTRACT

A cable connector assembly includes: an electrical connector; and a cable electrically connected with the electrical connector, the cable including plural high-speed wires for transmitting high-speed signal, a pair of low-speed wires for transmitting low-speed signal, a pair of power wires for transmitting power signal, a pair of standby wires, a detection wire for transmitting detection signal, and a power supply wire; wherein the pair of standby wires, the detection wire, and the power supply wire are arranged in a line along a horizontal direction; the high-speed wires are evenly distributed on both sides of the line along a thickness direction vertical to the horizontal direction; the low-speed wires are disposed on a side of the line along the thickness direction; and the power wires are disposed on another side of the line along the thickness direction.

15 Claims, 9 Drawing Sheets

(51) Int. Cl.
  *H01R 13/6592* (2011.01)
  *H01R 12/59* (2011.01)
  *H01R 13/6581* (2011.01)
  *B23K 1/00* (2006.01)
  *B23K 31/02* (2006.01)
  *H01R 4/02* (2006.01)
  *B23K 26/22* (2006.01)
  *B23K 26/24* (2014.01)
  *B23K 26/32* (2014.01)
  *H01B 11/10* (2006.01)
  *H01R 12/77* (2011.01)
  *H01R 13/66* (2006.01)
  *H01R 24/60* (2011.01)
  *B23K 101/38* (2006.01)
  *H01R 13/6582* (2011.01)
  *H01R 107/00* (2006.01)

(52) U.S. Cl.
  CPC .......... *B23K 31/02* (2013.01); *H01B 11/1058* (2013.01); *H01R 4/023* (2013.01); *H01R 12/778* (2013.01); *H01R 13/6581* (2013.01); *H01R 13/665* (2013.01); *H01R 13/6658* (2013.01); *H01R 24/60* (2013.01); *B23K 2101/38* (2018.08); *H01R 13/6582* (2013.01); *H01R 2107/00* (2013.01)

(58) Field of Classification Search
  CPC .... H01R 13/6594; H01R 9/032; H01R 9/035; H01R 12/596; H01R 12/53; H01R 13/6585; H01B 11/02; H01B 11/04; H01B 11/1058; H01B 11/002; H01B 9/003
  USPC .......................................................... 439/581
  See application file for complete search history.

(56) References Cited

U.S. PATENT DOCUMENTS

| | | | |
|---|---|---|---|
| 8,011,950 B2* | 9/2011 | McGrath | H01R 12/594 439/497 |
| 9,257,797 B2* | 2/2016 | Kuang | H01R 9/038 |
| 9,620,910 B2 | 4/2017 | Chen | |
| 2002/0139561 A1* | 10/2002 | Buck | H01B 7/0892 174/113 R |
| 2010/0051318 A1* | 3/2010 | Wang | H01B 11/12 174/113 R |
| 2010/0084157 A1* | 4/2010 | Wang | H01B 11/12 174/107 |
| 2011/0278043 A1* | 11/2011 | Ueda | H01B 7/1895 174/115 |
| 2016/0079689 A1 | 3/2016 | Wu et al. | |

FOREIGN PATENT DOCUMENTS

| | | |
|---|---|---|
| CN | 105702327 A | 6/2016 |
| CN | 105702334 A | 6/2016 |
| CN | 205583296 U | 9/2016 |

* cited by examiner

CABLE CONNECTOR ASSEMBLY AND IMPROVED CABLE

BACKGROUND OF THE INVENTION

1. Field of the Invention

The present invention relates generally to a cable connector assembly and more particularly to an improved cable thereof easier to accommodate the thickness of connectors.

2. Description of Related Arts

U.S. Patent Application Publication No. 2016/0079689, published on Mar. 17, 2016, shows a cable connector assembly for high-speed signal transmission. The cable connector assembly includes a connector and a cable electrically connected to the connector. The cable includes a plurality of conductors and insulative layers enclosing the conductors. The cross section of the cable is circular such that the size thereof is large, difficult to meet the requirement of thin cable.

U.S. Pat. No. 9,620,910, issued on Apr. 11, 2017, shows a data transmission cable including a first wire and a second wire adjacent to each other. Each of the first wire and the second wire has a central conductor and a cover layer enclosing the conductor. The data transmission cable further includes grounding wires disposed between adjacent pairs of first wire and second wire.

China Patent No. 204884664, issued on Dec. 16, 2015, shows a USB Type-C flat cable including two pairs of power cords, two pairs of high-speed differential signal lines, one pair of low-speed differential signal line, one pair of control lines, a plurality of earth connection and claddings. The flat cable follows the central axis bilateral symmetry.

An improved cable wires arrangement in a cable connector assembly is desired.

SUMMARY OF THE INVENTION

An object of the present invention is to provide an improved cable in a cable connector assembly which has a reduced thickness.

To achieve the above-mentioned object, a cable connector assembly comprises: an electrical connector; and a cable electrically connected with the electrical connector, the cable including a plurality of high-speed wires for transmitting high-speed signal, a pair of low-speed wires for transmitting low-speed signal, a pair of power wires for transmitting power signal, a pair of standby wires, a detection wire for transmitting detection signal, and a power supply wire; wherein the pair of standby wires, the detection wire, and the power supply wire are arranged in a line along a horizontal direction; the high-speed wires are evenly distributed on both sides of the line along a thickness direction vertical to the horizontal direction; the low-speed wires are disposed on a side of the line along the thickness direction; and the power wires are disposed on another side of the line along the thickness direction.

DETAILED DESCRIPTION OF THE PREFERRED EMBODIMENT

Figure 1:
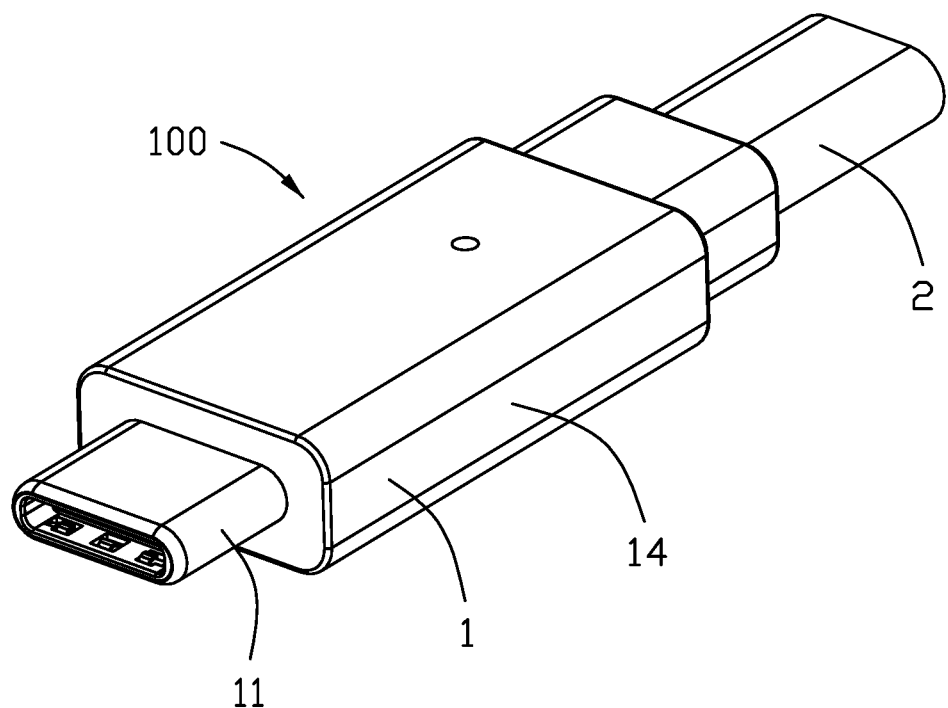
FIG. 1 is a perspective view of a cable connector assembly in accordance with the present invention.
Figure 2:
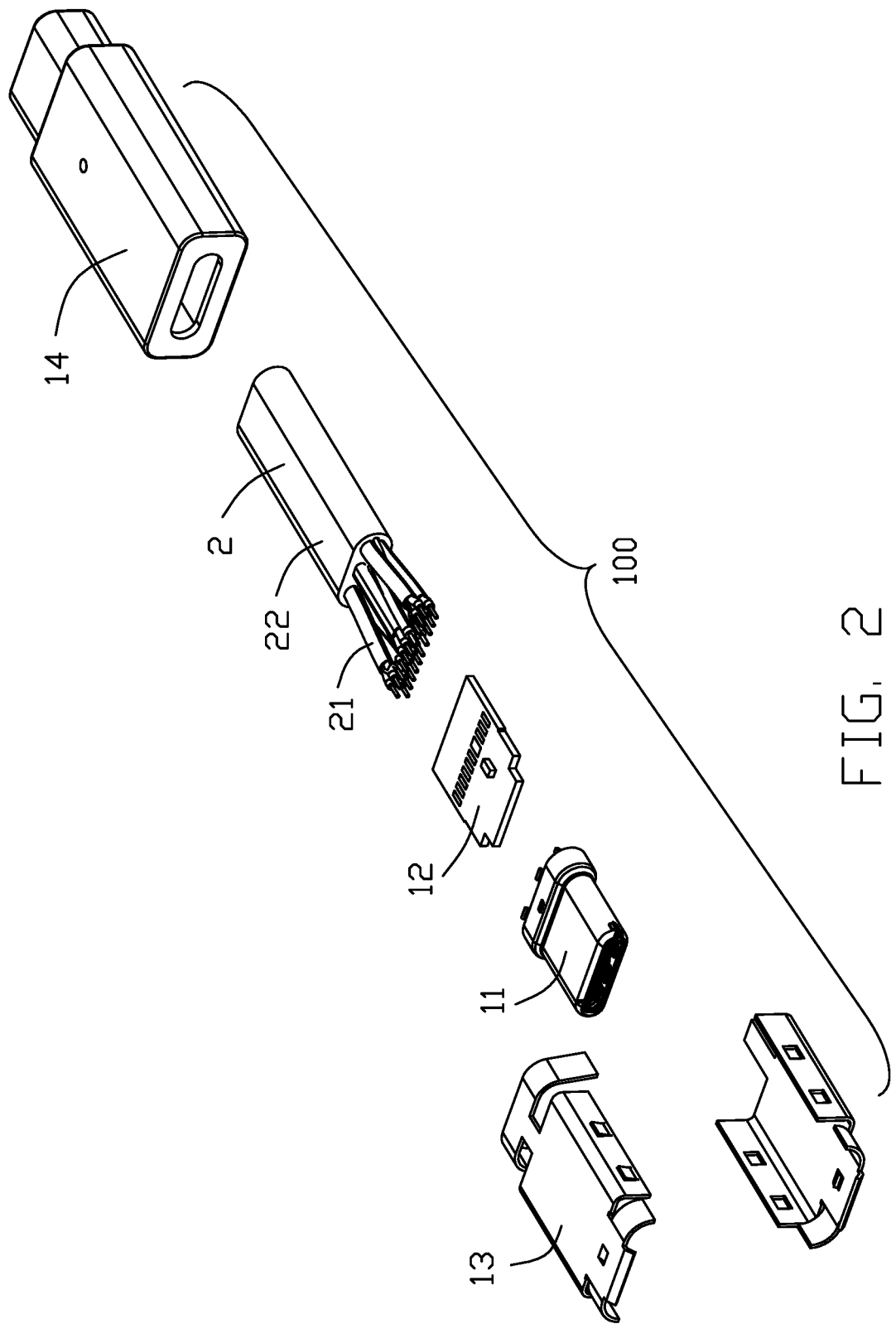
FIG. 2 is an exploded view of the cable connector assembly in FIG. 1.
Figure 3:
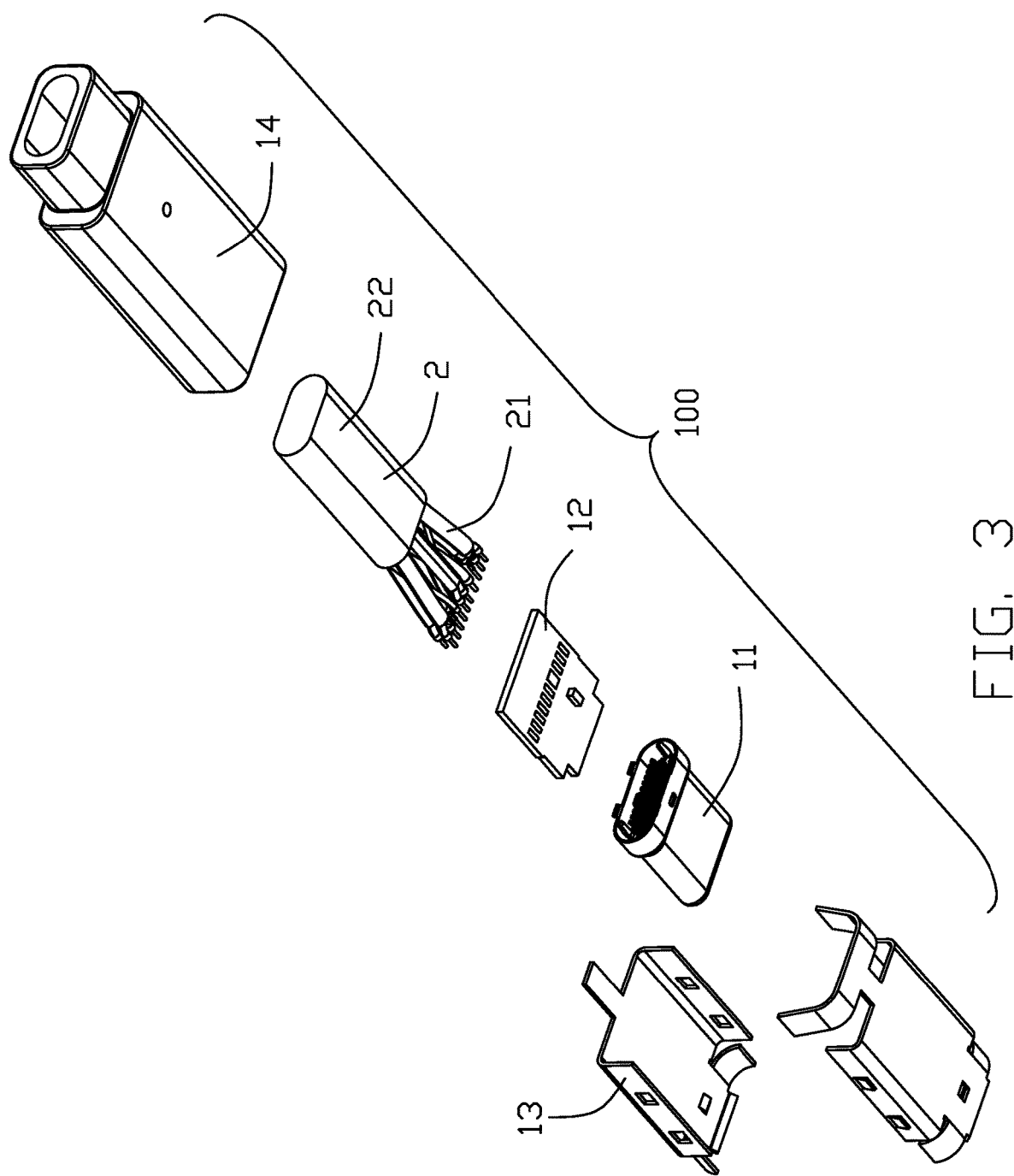
FIG. 3 is an exploded view similar to FIG. 2, but from a different aspect.
Figure 4:
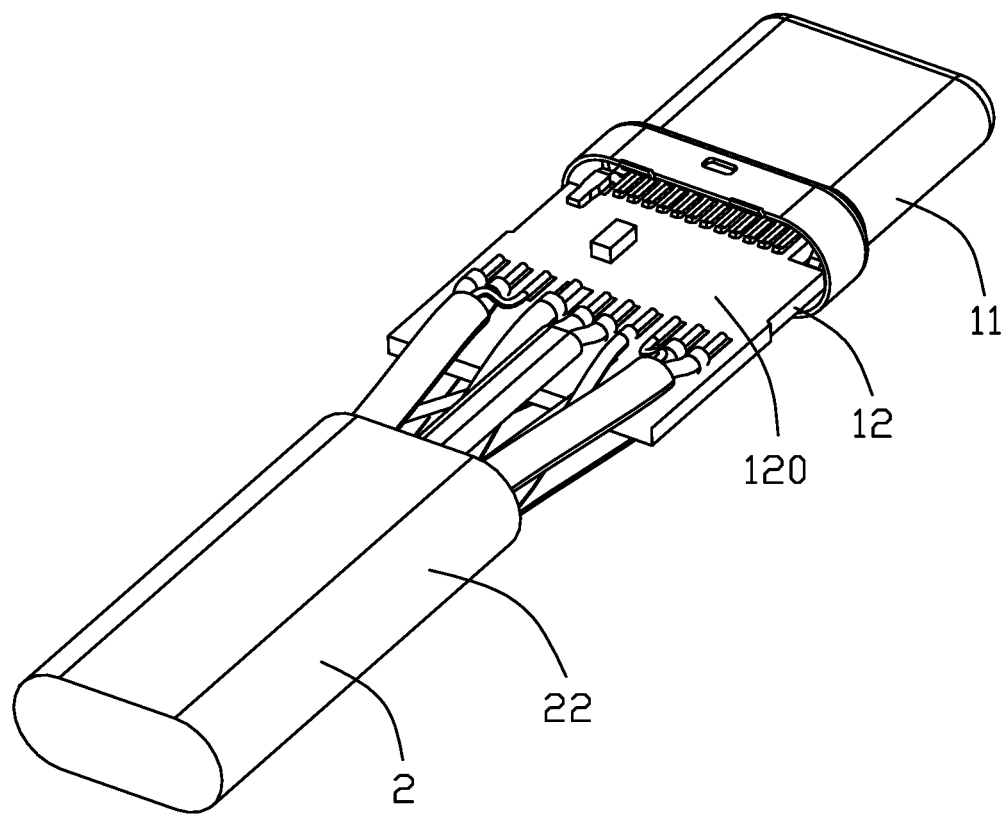
FIG. 4 is a partially perspective view of the assembly including the cable, the mating member and the printed circuit board.
Figure 5:
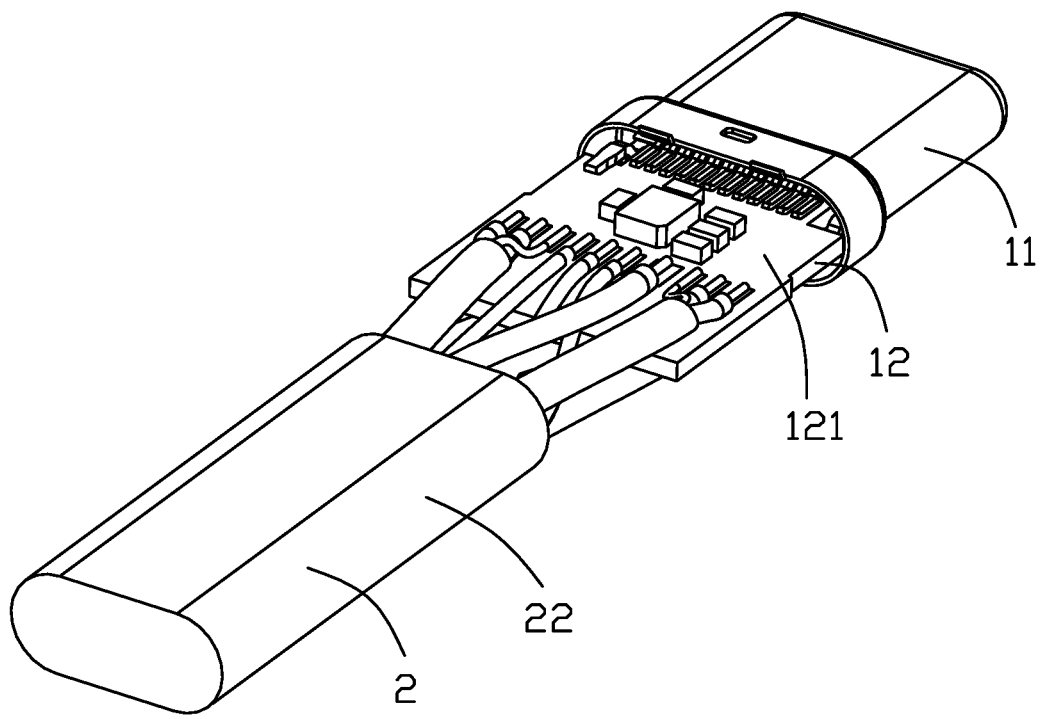
FIG. 5 is a partially perspective view similar to the FIG. 4, but from a different aspect.
Figure 6:
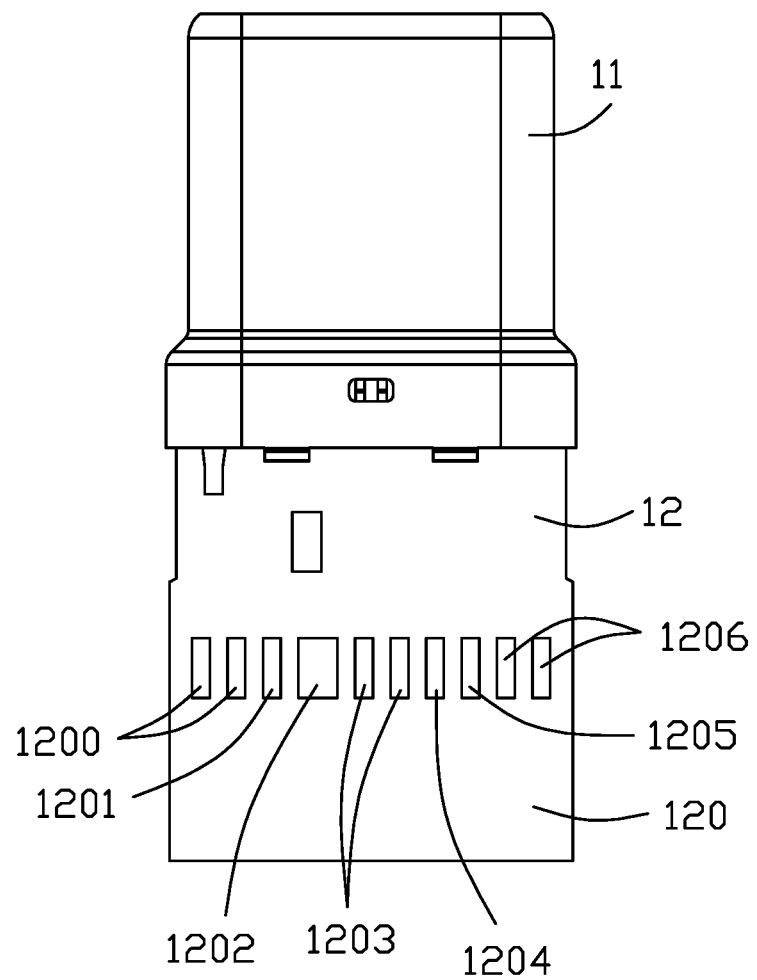
FIG. 6 is a top view of the cable and the printed circuit board of the cable connector assembly in FIG. 1.
Figure 7:
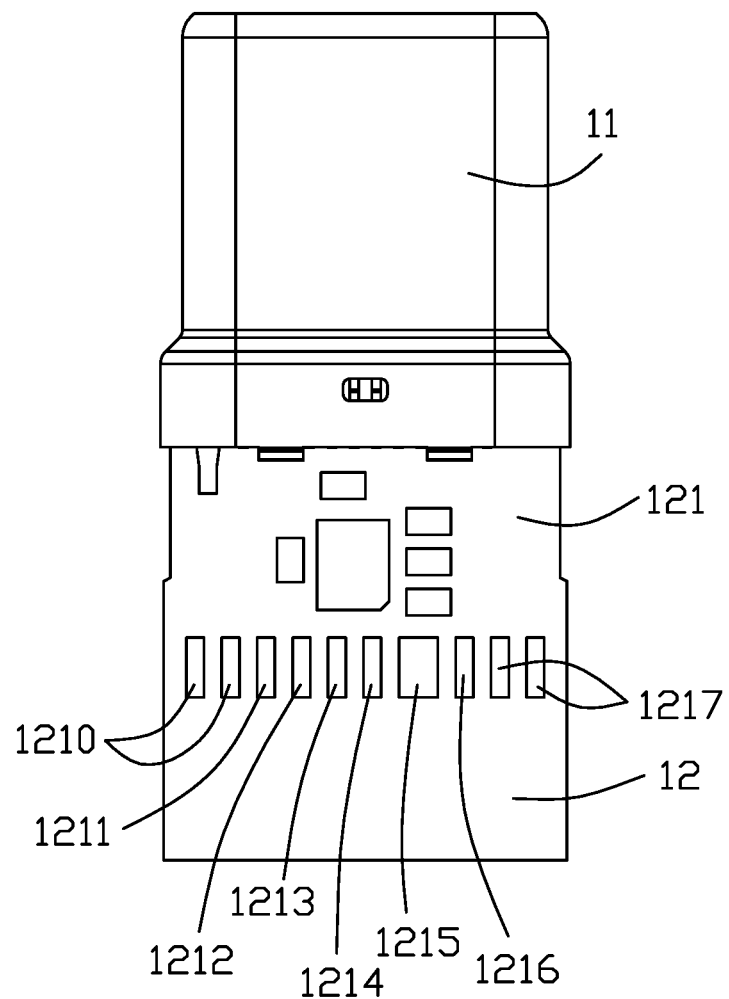
FIG. 7 is a bottom view of the cable and the printed circuit board of the cable connector assembly in FIG. 1.
Figure 8:
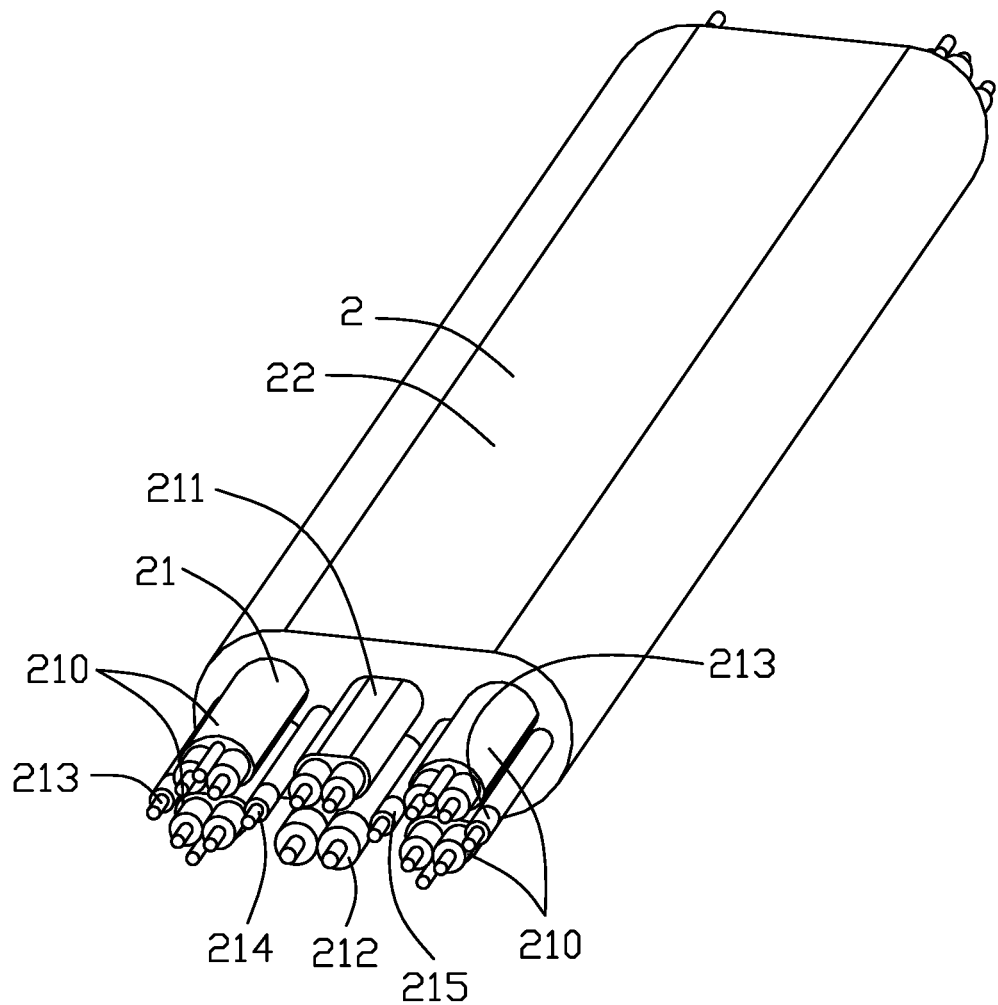
FIG. 8 is a perspective view of the cable of the cable connector assembly show in FIG. 1.
Figure 9:
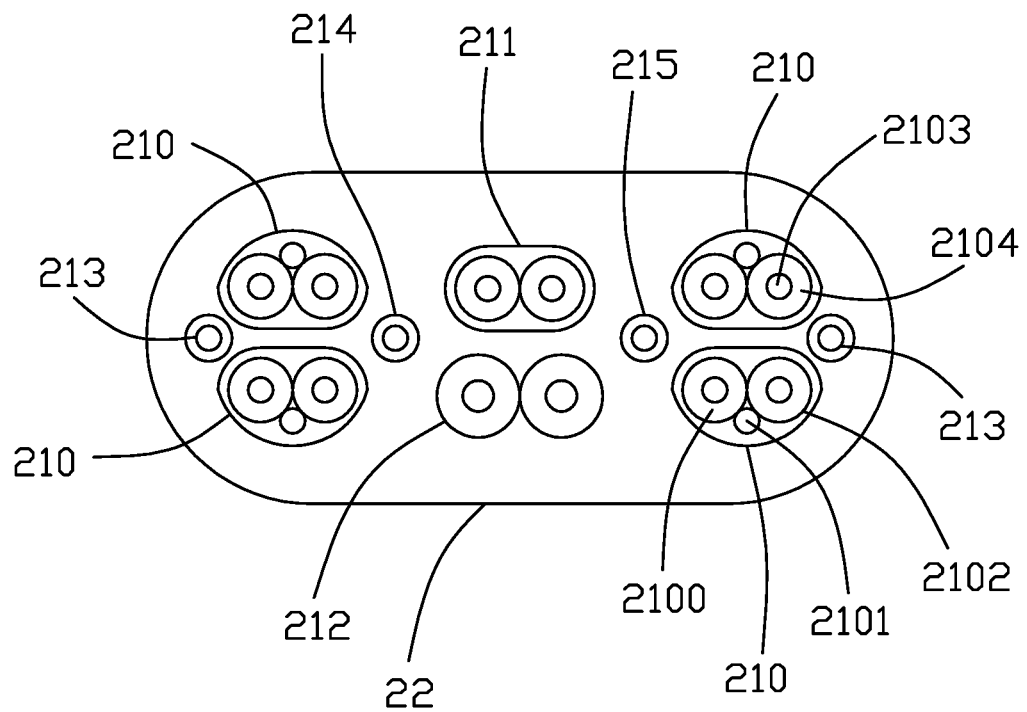
FIG. 9 is a front view of the cable of the cable connector assembly shown in FIG. 8.

Referring to FIGS. 1 to 9, a cable connector assembly 100, in accordance with the present invention for mating with a mating connector (not shown), comprises an electrical connector 1 and a cable 2 electrically connected to the electrical connector 1. The electrical connector 1 includes a mating member 11 for being inserted to the mating connector, a printed circuit board 12 electrically connected with the mating member 11 and the cable 2, a metal case 12 enclosing the mating member 11 and the printed circuit board 12 and a outer case enclosing the metal case 13 and the cable 2.

Referring to FIGS. 2-5 and 8-9, the cable 2 includes a plurality of wires 21 and a plurality of insulative layers 22 each enclosing the corresponding wires 21. The cable is used to transmit signal conforms to USB Type C. The wires 21 includes four high-speed wires 210 for transmitting high-speed signal, a pair of low-speed wires 211 for transmitting low-speed signal, a pair of power wires 212 for transmitting power signal, a pair of standby wires 213, a detection wire 214 for transmitting detection signal, and a power supply wire 215 for the internal power supply of the electrical connector 1.

Each of the high-speed wires 210 includes a pair of coaxial wires 2100, a grounding/drain wire 2101 disposed outside the coaxial wires 2100, a shielding layer 2102 enclosing the coaxial wires 2100 and the grounding wire 2101. Each pair of coaxial wires 2100 is used to transmit a high-speed differential signal. Each of the coaxial wires 2100 includes an inner conductor 2103 and an inner insulative layer 2104 enclosing the inner conductor 2103. The low-speed wires 211 are a pair of twisted pairs for transmitting a USB 2.0 signal with a lower speed. The lower speed wires 211 may further includes a grounding wire and shielding layer, which is possible to effectively derive messy signal, and effectively reduce the external radiation and anti jamming capability of the low-speed wires 211. The pair of power wires 212 is used to transmit positive and negative signals of the power supply, respectively. The pair of standby wires 213 may be configured to transmit signals such as audio as needed.

The pair of standby wires 213, the detection wire 214, and the power supply wire 215 are arranged in a line along a horizontal/transverse direction which is vertical to a thickness/vertical direction and an extension direction. The detection wire 214 and the power supply wire 215 are disposed between the pair of standby wires 213. The four high-speed wires 210 are evenly distributed on both sides of the line along the thickness direction. The four high-speed wires 210 respectively deposed on both sides are opposite to each other along the thickness direction. The low-speed wires 211 are disposed on a side of the line along the thickness direction, and the power wires 212 are disposed on another side of the line along the thickness direction. The low-speed wires 211 are opposite to the power wires 212 along the thickness direction. The low-speed wires 211 are disposed between the pair of high-speed wires 210 located on a same side with the lower speed wires 211 along the thickness direction. The low-speed wires 211 and the power wires 212 are disposed between the power supply wire 215 and the detection wire 214 along a horizontal/transverse direction perpendicular to the thickness direction. A pair of high-speed wires 210 spaced along the thickness direction is disposed between one of the standby wires 213 and the detection wire 214, and another pair of the high-speed wires 210 spaced along the thickness direction is disposed between another standby wire 213 and the power supply wire 215. The pair of standby wires 213, the detection wire 214 and the power supply wire 215 are arranged separately from each other, by widening the spacing between each other, together with the shielding layers 2102 of the corresponding high-speed wires 210, to effectively prevent mutual coupling effect between them, thus, meets the requirements for low frequency crosstalk of the USB type C.

Referring to FIGS. 4 to 7, the printed circuit board 12 includes a top surface 120 and an opposite bottom surface 121. A rear end of the top surface 120 defines a plurality of conductive pads along the horizontal direction, which sequentially includes a pair of first high-speed conductive pads 1200 for welding with a pair of coaxial wires 2100 of a first high-speed wires 210, a first grounding conductive pad 1201 for welding with the grounding wire 2101 of the first high-speed wire 210, a first power conductive pad 1202 for welding with one of the power wires 212, a pair of low-speed conductive pads 1203 for welding with the pair of low-speed wires 211, a first standby conductive pad 1204 for welding with one of the standby wires 213, a second grounding conductive pad 1205 for welding with the grounding wire 2101 of a second high-speed wire 210, a pair of second high-speed conductive pads 1206 for welding with the pair of coaxial wires 2100 of the second high-speed wire 210. A rear end of the bottom surface 121 defines a plurality of conductive pads along the horizontal direction, which sequentially includes a pair of third high-speed conductive pads 1210 for welding with the pair of coaxial wires 2100 of a third high-speed wire 210, a third grounding conductive pad 1211 for welding with the grounding wire 2101 of the third high-speed wire 210, a detection conductive pad 1212 for welding with the detection wire 214, a power supply conductive pad 1213 for welding with the power supply wire 215, a second standby conductive pad 1214 for welding with another of the standby wires 213, a second power conductive pad 1215 for welding with another of the power wires 212, a fourth grounding conductive pad 1216 for welding with the grounding wire 2101 of a fourth high-speed wire 210 and a pair of fourth high-speed conductive pads 1217 for welding with the pair of coaxial wires 2100 of the fourth high-speed wire 210. The four high-speed wires 210 are arranged on four corner positions, most likely to avoid interference with each other. The four high-speed wires 210 correspond to the first high-speed conductive pads 1200, the second high-speed conductive pads 1206, the third high-speed conductive pads 1210 and the fourth high-speed conductive pads 1217, easy to be weld and ensure the signal integration performance of cable 2. In brief, in a cross-sectional view, there are nine positions defined by the upper level, the lower level and the middle level in the thickness direction, and a left column, the right column and the middle column in the horizontal direction wherein all the wires are respectively systematically arranged in the respective positions for easy manufacturing and superior performance.

What is claimed is:

1. A cable connector assembly comprising:
   an electrical connector; and
   a flat cable electrically connected with the electrical connector, the cable including a plurality of high-speed wires for transmitting high-speed signal, a pair of low-speed wires for transmitting low-speed signal, a pair of power wires for transmitting power signal, a pair of standby wires, a detection wire for transmitting detection signal, and a power supply wire; wherein
   the pair of standby wires, the detection wire, and the power supply wire are arranged in a line along a horizontal direction;
   the high-speed wires are evenly distributed on both sides of the line along a thickness direction vertical to the horizontal direction;
   the low-speed wires are disposed on a side of the line along the thickness direction;
   the power wires are disposed on another side of the line along the thickness direction; and
   a portion of the plurality of high-speed wires are arranged to be located directly between one of the standby wires and the detection wire along the horizontal direction, and a remaining portion of the plurality of high-speed wires are arranged to be located directly between another of the standby wires and the power supply wire along the horizontal direction.

2. The cable connector assembly as claimed in claim 1, wherein the low-speed wires are arranged opposite to the power wires along the thickness direction.

3. The cable connector assembly as claimed in claim 1, wherein the high-speed wires disposed on both side of the line are arranged opposite to each other along the thickness direction.

4. The cable connector assembly as claimed in claim 1, wherein the low-speed wires are disposed between the high-speed wires located on a same side of the line.

5. The cable connector assembly as claimed in claim 1, wherein the power wires are disposed between the high-speed wires located on a same side of the line.

6. The cable connector assembly as claimed in claim 1, wherein the detection wire and the power supply wire are disposed between the pair of standby wires.

7. The cable connector assembly as claimed in claim 1, wherein the low-speed wires and the power wires are arranged between the power supply wire and the detection wire along the horizontal direction.

8. The cable connector assembly as claimed in claim 1, wherein each of the high-speed wires includes a pair of coaxial wires side by side, a grounding wire arranged outside of the pair of coaxial wires, and a shielding layer enclosing the coaxial wires and the grounding wire.

9. A flat cable comprising:
   in a cross-sectional view defined by a transverse direction and a thickness direction perpendicular to each other and defining in the thickness direction, an upper level, a lower lever and a middle level between the upper level and the lower level, and in the transverse direction, a right column, a left column and a middle column between the right column and the left column;
   four pairs of high speed wires for transmitting high-speed differential signals being respectively located at four positions respectively defined by the upper level and the right column, the lower level and the right column, the upper level and the left column, and the lower level and the left column;
a pair of low speed wires for transmitting low-speed differential signals being located at a position defined by the upper level and the middle column; and
a pair of power wires for delivering power being located at a position defined by the lower level and the middle column,
further including a single standby wire and a single detection wire respectively located at two positions defined by the middle level, and independently, solely, intimately and directly by two sides of the left column.

10. The flat cable as claimed in claim 9, wherein each of the single standby wire and the single detection wire are diametrically smaller than each of the pair of high speed wires.

11. The flat cable as claimed in claim 10, wherein each pair of high speed wires is equipped with a grounding wire while the pair of low speed wires is not equipped with any grounding wire.

12. A flat cable comprising:
in a cross-sectional view defined by a transverse direction and a thickness direction perpendicular to each other and defining in the thickness direction, an upper level, a lower lever and a middle level between the upper level and the lower level, and in the transverse direction, a right column, a left column and a middle column between the right column and the left column;
four pairs of high speed wires for transmitting high-speed differential signals being respectively located at four positions respectively defined by the upper level and the right column, the lower level and the right column, the upper level and the left column, and the lower level and the left column;
a pair of low speed wires for transmitting low-speed differential signals being located at a position defined by the upper level and the middle column; and
a pair of power wires for delivering power being located at a position defined by the lower level and the middle column,
further including a single standby wire and a single power supply wire respectively located by two positions defined by the middle level, and independently, solely, intimately and directly by two sides of the right column.

13. The flat cable as claimed in claim 12, each of the single standby wire and the single power wire are diametrically smaller than each of the pair of high speed wires.

14. The flat cable as claimed in claim 12, further including another standby wire and a detection wire respectively located at two positions defined by the middle level and intimately by two sides of the left column.

15. The flat cable as claimed in claim 12, wherein each pair of high speed wires is equipped with a grounding wire while the pair of low speed wires is not equipped with any grounding wire.

* * * * *